3,047,845
TELEMETERING OVER A SINGLE CHANNEL BY VARIABLE PULSE AND VARIABLE INTERVAL ENCODING

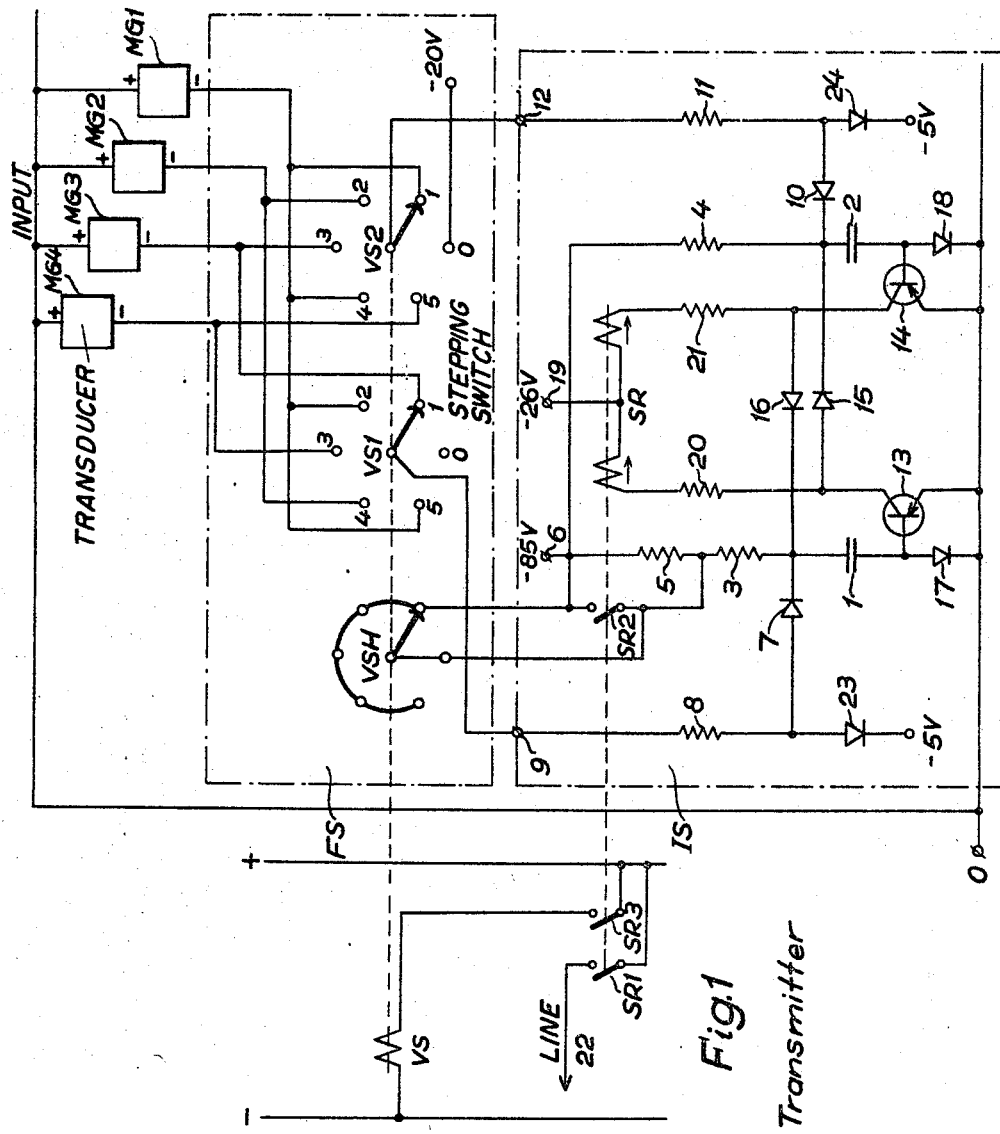

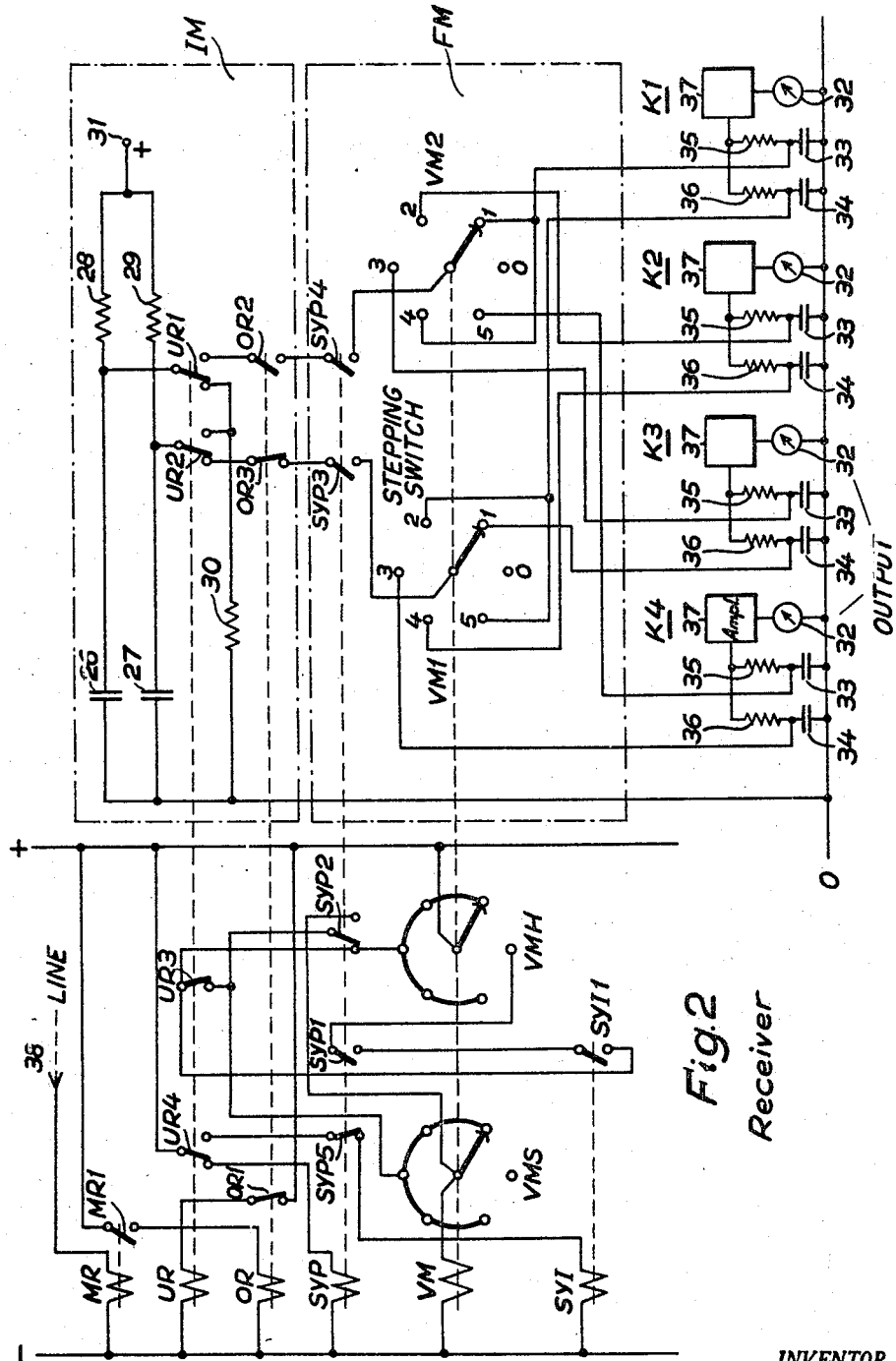
Fig.2 Receiver

Hugo Hansson, Vasteras, Sweden, assignor to Allmanna Svenska Elektriska Aktiebolaget, Vasteras, Sweden, a Swedish corporation
Filed Apr. 13, 1959, Ser. No. 806,060
Claims priority, application Sweden Apr. 19, 1958
2 Claims. (Cl. 340—184)

The present invention relates to a system for remote metering over a single transmission channel a plurality of metered quantities by means of an electrical impulse series.

When several different metered quantities are to be remote metered by means of a single transmission channel, the different metered quantities must be transmitted one after another. In this case one generally uses rotating distributers or selectors in the receiving and transmitting stations, which are driven synchronously and simultaneously connect a certain metered quantity to the transmitter in the transmitting station, and a corresponding receiver in the receiving station. Each metered quantity is transmitted once or eventually several times per rotation of the rotating distributer and due to the cyclical repetition a remote metering of this type is generally called a cyclical metering.

In hitherto known systems for cyclical remote metering, the metered quantities are generally transmitted by means of an electrical impulse series, the impulse frequency of which is proportional to the metered quantity transmitted at the moment. As it is the frequency of the impulse series which represents the metered quantities, it is necessary that a comparatively large number of impulse periods, generally about ten at a time, is transmitted for each metered quantity, in order to make it possible to achieve in the receiving station a correct conception of the value of the metered quantity. This means that even if a small number of different metered quantities is transmitted, the time interval between the different transmissions of one and the same metered quantity becomes very long, due to which it is impossible to discover rapid variations in the metered quantity at the receiving station. For all cyclical metering it is further required that the rotating distributers in the transmitting and receiving stations operate in synchronism. In hitherto known systems for cyclical metering, it has, however, only been ascertained that the distributers are started at the same time, after which they have operated entirely independently of one another. As this makes its impossible to guarantee that the distributers are always in synchronism, in order to avoid metering errors a new receiver was connected in the receiving station first a certain time after the connection of a new metered quantity in the transmitting station and in a corresponding way the receiver was disconnected a certain time before the disconnnection of the metered quantity. Due to this there is at each changing of metered quantity in the transmitting station, a comparatively long time during which no receiver is connected. In this way erroneous metering is certainly prevented even if the distributers in the transmitting and receiving stations are not in absolute synchronism. At the same time, however, this method means that the transmission time on the transmission channel is not made full use of, due to which the metering becomes slow.

The object of the present invention is to provide a system for remote metering over a single transmission channel of a plurality of metered quantities by means of an electrical impulse series which system is more simple than previously known systems and gives a more rapid transmission of the metered quantities so that also comparatively rapid variations of short duration can be observed in the receiving station.

The system according to the invention consists substantially of a transmitting device comprising an impulse transmitter arranged to produce an impulse series in which the duration of the impulses and the intervals is proportional to an electric quantity connected to the input circuit of the impulse transmitter and further a cyclically operating step-by-step switching device, for instance a rotating, electro-magnetically driven selector, governed by the impulse series produced, which is arranged to connect electric quantities proportional to the different metered quantities in a certain succession one after another to the input circuit of the impulse transmitter, and to connect a new quantity proportional to a new metered quantity at the end of each impulse period in the produced impulse series. The system consists further of a receiving device for the impulse series produced by the impulse transmitter, which receiving device comprises an impulse receiver arranged to produce for each impulse period in the impulse series a quantity which is proportional to the duration of the period, and to transfer this quantity at the end of the period to a storage device connected to the impulse receiver, and a cyclically operating step-by-step switching device, for instance a rotating electromagnetically driven selector, governed by the input series, which is arranged to connect a number of storage devices corresponding to the number of metered quantities, to said impulse receiver one after another in the same succession as the electric quantities proportional to the different metered quantities are connected to the input circuit of the impulse transmitter, and to connect a new storage device at the end of each impulse period in the impulse series.

As in the system according to the invention only one impulse period is transmitted at a time for each metered quantity, the time between separate transmissions of one and the same metered quantity becomes very short, due to which comparatively rapid and short variations in the metered quantities can be observed in the receiving stations also. As the cyclically operating switching devices in the transmitting and receiving stations are governed directly by the transmitted impulse series representing the metered quantities, they will with certainty operate in synchronism without any special synchronising impulses being transmitted between the transmissions of the separate metered quantities. Due to this, the system according to the invention becomes very simple and the metering very rapid.

According to the invention the impulse receiver is suitably so arranged that it produces for each impulse, as well as each interval in the impulse series, a quantity proportional to the duration of the impulse or interval respectively and transfers at the end of each impulse and interval the quantity proportional to the duration of the impulse or interval to the storage device connected at the moment by the cyclically operating switching devices, and the storage devices are so arranged that they produce and store a quantity which is proportional to the sum of the two quantities proportional to the duration of an impulse and an interval respectively, which are transferred last to the considered storage device.

If the impulse receiver and the storage devices are arranged in this way, the cyclically operating switching device in the transmitting station is according to the invention suitably arranged to connect a quantity proportional to a new metered quantity to the input circuit of the impulse transmitter at the end of each impulse as well as each interval in the produced impulse series and to connect for each one of the metered quantities a proportional quantity to the input circuit of the impulse transmitter at least twice per cycle of the switching device, once during an impulse and once during an interval so that consecutive impulses and intervals in the transmitted impulse series do not represent the same metered quantity but for each metered quantity at least one complete impulse period is transmitted per cycle of the switching device. At the same time the cyclically operating switching device in the receiving device is of course arranged to connect the storage devices to the impulse receiver in the same succession as the quantities' proportional to the different metered quantities are connected to the input circuit of the impulse transmitter so that the quantities produced by the impulse receiver and proportional to the duration of impulses and intervals representing one and the same metered quantity are always transferred to the same storage device.

As in this form of the invention only one impulse or interval at a time is transmitted for each metered quantity, the time between consecutive transmissions of one and the same metered quantity becomes shorter, due to which variations in the metered quantities can be observed still more rapidly in the receiving station. By spacing the impulses and intervals belonging to the same metered quantity as regularly as possible within the cycle of the switching device, the further advantage is obtained that the movement of the instruments indicating the metered quantities in the receiving stations becomes more smooth.

The same operation and advantages can also be obtained in another form of the invention in which the impulse transmitter is provided with two input circuits and is arranged to produce an impulse series in which the duration of the impulses is proportional to an electrical quantity connected to one of said input circuits and the duration of the intervals is proportional to an electric quantity connected to the other input circuit, and in which the cyclically operating step-by-step switching device in the transmitting station is arranged to connect two electric quantities proportional to separate metering quantities to one of the input circuits each of the impulse transmitters and to connect at the end of each impulse period of the impulse series a new pair of quantities proportional to two other metered quantities to the input circuits and to connect for each metered quantity a proportional quantity at least once per cycle of the switching device to each one of the input circuits of the impulse transmitter. Also in this form of the invention, the cyclically operating switching device in the receiving station is of course arranged to connect the storage devices to the impulse receiver in a succession corresponding to the succession in which the electric quantities proportional to different metered quantities are connected to the impulse transmitter so that the quantities produced by the impulse receiver, and proportional to the duration of the impulses and intervals representing one and the same metered quantity, are always transferred to the same storage device.

Although it is not necessary in the system according to the invention to transmit special synchronising impulses it is, however, advantageous in the invention to transmit once per cycle of the rotating switching devices a special synchronising mark preferably consisting of an impulse period with a form which deviates from the form of the impulse periods representing the metered quantities, in which case the cyclically operating switching device in the receiving station is arranged to occupy automatically, at the occurrence of such a synchronising impulse period, a certain position and to leave this position only at the occurrence of such a synchronising impulse period. In this way it is achieved that the switching devices in the transmitting and receiving stations are automatically synchronised after an interruption in the transmission of the impulse series.

In the following, the invention will be further described with reference to the accompanying drawing which, by way of example, shows one form of the system according to the invention.

FIGURE 1 shows the transmitting device and FIGURE 2 the receiving device.

The transmitting device in FIGURE 1 consists of an impulse transmitter IS, a cyclically operating distributor FS and a number of converters MG1–MG4 for metered quantities. The impulse transmitter IS consists of two capacitors 1 and 2 which are connected in series with resistors 3, 4 and 5 to a constant direct voltage at the terminal 6. The capacitor 1 is connected to the one input terminal 9 of the impulse transmitter through the diode 7 and the resistor 8, and the other capacitor 2 is connected to the other input terminal 12 of the impulse transmitter through a diode 10 and a resistor 11. The impulse transmitter comprises further two transistors 13 and 14, which are connected in series with direct-voltage-biased diodes 15 and 16 respectively, in parallel across one each of the capacitors 1 and 2. The base circuit of the transistor 13 is connected in parallel across a diode 17 which is connected in series with the capacitor 1 so that the transistor 13 is controlled by the current through the capacitor 1. The base circuit of the transistor 14 is in a corresponding way connected in parallel across a diode 18 which is connected in series with the capacitor 2 so that the transistor 14 is controlled by the current through this capacitor 2. The diodes 15 and 16 are biased by a direct voltage connected to the terminal 19, which voltage through two windings on a polarised transmitting relay SR and two resistors 20 and 21 is connected to the junction points between the diodes 15 and 16 and the transistors 13 and 14. The transmitting relay SR is provided with a contact SR1 for transmitting an impulse series upon the output conductor 22 from the transmitting station and a contact SR2 for short-circuiting the resistor 5. The resistor 5 is also connected in parallel with a movable contact of a switch VSH which is normally closed so that the resistor 5 is short-circuited. Two capacitors 39 and 40 are connected between earth and the junction points between the diodes 7 and 32, and 10 and 24 respectively.

In order to explain the operation of the impulse transmitter IS we assume that at a certain moment the capacitor 1 is charged by a substantially constant direct current achieved from the terminal 6 through the resistor 3 and the closed contact VSH. The charging current through the capacitor 1 flows through the base of the transistor 13 so that the transistor is conductive. The collector of the transistor 13 consequently has substantially zero potential so that the diode 15 is also conductive. The transistor 13 and the diode 15 consequently short-circuit the capacitor 2 so that no current flows through it. The transistor 14 is therefore not conductive and its collector assumes substantially the potential of the terminal 19. So long as the voltage across the capacitor 1 is smaller than the direct voltage connected to the terminal 19 and the direct voltage connected to the input terminal 9, the diodes 7 and 16 are not conductive. As the transistor 13 is conductive, a current flows from the terminal 19 through the left winding of the transmitting relay SR, the resistor 20 and the transistor 13 to the earth, whereas the right winding of the transmitting relay SR has no current as the transistor 14 is not conductive. The transmitting relay SR is consequently in its on-position and its contact SR1 is closed and transmits an impulse on the conductor 22. When the voltage across the capacitor 1 reaches the same value as the direct voltage connected to the input terminal 9, which voltage is assumed to be smaller than the direct voltage connected to the terminal 19, the diode 7 starts to conduct, and a large portion of the current through the resistor 3 is momentarily taken over by the capacitor 39 so that a momentarily large reduction of the charging current through the capacitor 1 is achieved. Then the transistor 13 is cut off and becomes non-conductive and its collector assumes the potential of the direct voltage connected to the terminal 19. The diode 15 becomes consequently also non-conductive and the capacitor 2 begins to charge with a substantially constant direct current from the terminal 6 through the resistor 4. This charging current flows through the base circuit of the transistor 14 so that the transistor 14 becomes conductive as well as the diode 16, and short-circuits the capacitor 1. The capacitor 1 is consequently discharged through the diode 16 and the transistor 14. As the transistor 13 has now become non-conductive, the current through the left winding of the transmitting relay SR ceases and a current is obtained instead from the terminal 19 through the right winding of the transmitting relay SR, the resistor 21 and the transistor 14. The transmitting relay consequently drops out and its contact SR1 is opened so that an interval is obtained in the impulse series on the output conductor 22 (one impulse, plus one interval constituting an impulse series). The time for the charging of the capacitor 1 is of course, assuming that the charging current from the terminal 6 is substantially constant, proportional to the direct voltage connected to the input terminal 9, so that the duration of the produced impulse becomes proportional to the direct voltage connected to the input terminal 9. In a corresponding way the time for charging of the capacitor 2, that is the duration of the interval, is proportional to the direct voltage connected to the input terminal 12. The impulse transmitter produces consequently an impulse series upon the output terminal 22 in which the duration of the impulses is proportional to the direct voltage connected to the input terminal 9 and the duration of the intervals is proportional to the direct voltage connected to the input terminal 12. If no voltages are connected to the input terminals 9 and 12 of the impulse transmitter the transmitter produces, in spite of this, an input series in which the duration of the impulses and intervals is determined by the constant direct voltages connected to the input terminals of the impulse transmitter through the diodes 23 and 24.

The cyclically operating distributor FS consists of an electro-magnetically driven step selector VS which is driven by a contact SR3 on the transmitting relay SR in the impulse transmitter. The selector VS is so constructed that it moves one step when the current in the selector coil disappears, due to which the step-by-step movement takes place after each impulse transmitted upon the output conductor 22. The selector VS is provided with two contact banks VS1 and VS2, of which the one VS1 connects different direct voltages to the input terminal 9 of the impulse transmitter and the other VS2 connects different direct voltages to the other input terminal 12 of the impulse transmitter. The direct voltages which are connected to the input terminals 9 and 12 of the impulse transmitter through the selector banks VS1 and VS2 are derived from four converters MG1, MG2, MG3 and MG4, of metering quantities. These converters produce voltages, which vary between 5 and 20 v. and are each proportional to one metered quantity. The converter MG1 is connected to the positions 1 and 4 on the contact bank VS2 and to the positions 2 and 5 on the contact bank VS1. The converter MG2 is connected to the position 2 on the bank VS2 and the position 4 on the bank VS1. The converter MG3 is connected to the position 3 on the bank VS2 and the position 1 on bank VS1. The converter MG4 finally is connected to position 5 on bank VS2 and position 3 on bank VS1. When the selector VS occupies its position 1, it consequently connects a voltage proportional to the metered quantity 1 to the input terminal 12 on the impulse transmitter and a voltage proportional to the metered quantity 3 to the input terminal 9 of the impulse transmitter. Then consequently, first an interval is produced in the impulse series on the output conductor 22, the duration of which is proportional to the metered quantity 1, and after that an impulse the duration of which is proportional to the metered quantity 3. At the end of the impulse the selector VS takes one step under the influence of the contact SR3 of the transmitting relay SR to the position 2 at which a voltage proportional to the metered quantity 2 is connected to the input terminal 12 of the impulse transmitter and a voltage proportional to the metered quantity 1 is connected to the input terminal 9. Consequently first an interval is produced the duration of which is proportional to the metered quantity 2 and after that an impulse the duration of which is proportional to the metered quantity 1. After that the selector VS is automatically driven still another step to the position 3 and so on. To the position 0 on the bank VS2 a direct voltage of —20 v. is connected and to the position 0 on the bank VS1 no voltage at all is connected. The position 0 is the so-called home position of the selector VS. The contact VSH which is connected in parallel across the resistor 5 in the impulse transmitter IS is the home position contact of the selector VS, which is closed when the selector occupies any one of the positions 1 to 5 but which is open when the selector occupies the position 0. When the selector VS occupies this home position, a voltage of —20 v. is consequently connected to the input terminal 12 of the impulse transmitter and no voltage at all to the input terminal 9. As in this case the home position contact VSH of the selector as well as the contact SR2 of the transmitting relay is open, the charging current to the capacitor 1 is much smaller than when the selector VS occupies any one of its other positions. In the home position of the selector VS consequently, first an interval is produced which is much longer than any of the intervals representing metered quantities can be. At the end of the interval, the transmitting relay SR picks up and its contact SR2 is closed so that the charging current for the capacitor 1 assumes its normal value again and consequently a new impulse is produced, the duration of which is determined by the direct voltage of —5 v. connected through the diode 23. The duration of the impulse is consequently as short as the shortest possible impulse representing a metered quantity. The impulse period produced on the home position of the selector VS has consequently a form which deviates from the form of the impulse periods representing the metered quantities. This impulse period is used, as will be seen later in the specification, in the receiver for the synchronisation of the selector of the receiver.

The receiving device shown in FIGURE 2 consists of an impulse receiver IM, a cyclically operating distributor FM and four storage devices K1–K4. The impulse series transmitted from the transmitting device arrives at the receiver upon the single conductor 38 and influences a receiving relay MR. The receiving relay MR influences two auxiliary relays OR and UR. During an interval the relays MR and OR are in their off-positions whereas UR is in the on-position. The impulse receiver IM consists of two capacitors 26 and 27 which are connected in parallel with each other and each in series with a large resistor (28 and 29, respectively) to a constant direct voltage connected to the terminal 31. The impulse receiver comprises further, a number of contacts on the relays UR and OR for the transfer of the voltages of the capacitors 26 and 27 to the cyclically operating distributer FM and for short circuiting of the capacitors through a short circuiting resistor 30. The distributer FM consists of electromagnetically driven selector VM with two contact banks VM2 and VM1. The contact bank VM2 has as an object to distribute the voltages from the capacitor 26 to the storage devices K1 to K4, whereas the contact bank VM1 distributes the voltages from the capacitor 27 to the storage devices. Each one of the storage devices K1 to K4 consists of an amplifier 37 with a high input resistance, to the input circuit of which two capacitors 33 and 34 are connected in series with one resistor 35 and 36 each. To the output of the amplifier 37 a measuring instrument 32 is connected. The relay UR is provided with a contact UR4, which influences two synchronising relays SYP and SYI. At the beginning of an impulse the contact UR4 occupies its left-hand position and the relay SYP is consequently in its on-position whereas the relay SYI is in its off-position. At the beginning of an interval the relay UR transfers and the contact UR4 assumes its right-hand position. The relay SYP has, however, a certain time-lag so that it will not have time to drop out during an interval representing a metered quantity, so that the relay SYP is always in its on-position during normal impulses and intervals representing metered quantities, whereas SYI is always in its off-position. The selector VM is provided with a contact VMS for self driving which, during normal impulses and intervals, is short circuited by the contact SYP2 of the energized relay SYP. The selector VM is further provided with a home position contact device VMH, which is connected to a contact of switch SYP2 when the selector VM occupies any of its positions 1–5, but is connected to switch SYP1 when the selector VM is in its home position 0. When the selector VM occupies any one of the positions 1–5 and impulses and intervals representing metered quantities are received the selector is consequently driven by the contact UR3 on the relay UR. The contact UR3 opens at the end of each impulse and the selector VM is then driven one step from one position to the next.

We assume that the selector VM is in its position 1 and that the received part of the impulse series on the conductor 38 at the moment comprises an interval. During the interval the capacitor 26 is charged with a substantially constant direct current from the terminal 31 through the resistor 28 whereas the capacitor 27 is short circuited by the contact UR2 of the energized relay UR and the short circuiting resistor 30. The voltage across the capacitor 26 increases consequently linearly with the time. When the interval is finished and followed by an impulse upon the input conductor 38 the receiving relay MR is energized and its contact MR1 closes and the relay OR picks up. Then the contact OR2 closes and transfers the voltage of the capacitor 26, which voltage evidently is proportional to the duration of the past interval, to the contact bank VM2 of the selector VM. From the contact bank VM2 the voltage is transferred to the capacitor 33 in the storage device 1. Thereafter the relay UR drops out as the contact OR1 has opened, so that the contacts UR1 and UR2 change position. The capacitor 26 is consequently discharged through the contact UR1 and the short circuiting resistor 30 whereas the capacitor 27 begins to be charged by a constant direct current from the terminal 31 through the resistor 29. When the impulse upon the input conductor 38 is finished, the receiving relay MR drops out again upon which first its contact MR1 is closed and the relay OR drops out. Thereby the contact OR3 is closed and transfers the voltage of the capacitor 27, which voltage evidently is proportional to the duration of the past impulse, to the bank VM1 of the selector VM. From the bank VM1 the voltage is transferred to the capacitor 34 in the storage device K3. When the relay OR drops out its contact OR1 is closed and the relay UR is energized, so that the contacts UR1 and UR2 change position again and the capacitor 27 is short circuited through the contact UR2 and the short-circuiting device 30, whereas the capacitor 26 starts again to charge. Simultaneously the contact UR3, which has been closed during the impulse, is opened, due to which the selector VM is driven one step to the position 2. The voltage of the capacitor 26 is consequently at the end of the next interval transferred to the capacitor 33 in the storage device K2, whereas the voltage of the capacitor 27 at the end of the following impulse will be transferred to the capacitor 34 in the storage device K1. As can be seen from the drawing, the storage devices are so connected to the different positions of the selector banks VM1 and VM2 that the voltages which are produced by the impulse receiver IM, and are proportional to the intervals in the impulse series, are always transferred to the capacitors 33, whereas the voltages proportional to the impulses are always transferred to the capacitors 34 in the storage devices. The storage devices K1–K4 are furthermore connected to the selector banks VM1 and VM2 so that voltages proportional to the duration of intervals and impulses representing the metered quantity 1 are always transferred to the storage device K1, whereas voltages proportional to impulses and intervals representing the metered quantity 2 are always transferred to the storage device K2 and so on. Across the capacitor 33 in the storage device K1 there consequently exists always a voltage which is proportional to the duration of the last interval in the received impulse series representing the metered quantity 1, whereas across the capacitor 34 it is always a voltage which is proportional to the duration of the last impulse in the impulse series, representing the metered quantity 1. The two resistors 35 and 36 are equally large so that the voltage across the input of the amplifier 37 in the storage device K1 is proportional to the sum of the durations of the last interval and impulse in the received impulse series, representing the metered quantity 1. Because of the very large input resistance of the amplifier 37 this voltage is maintained, and it is possible to read on the instrument 32 connected to the output, the value of the metered quantity 1. In a corresponding way, the values of the metered quantities 2, 3, and 4 can be observed upon the measuring instruments 32 in the other storage devices K2, K3 and K4.

When the selector VM occupies its home position 0, its home position contact VMH is in its lower position. If then the impulse series contains normal impulses and intervals representing metered quantities, the selector VM will evidently not be driven from its home position as the open contact SYI1 prevents the driving of the selector VM. If, however, the impulse series contains a synchronising period which as already described consists of an extended interval and a short impulse the selector VM is driven from its home position 0 to its position 1. This is due to the fact that when the extended interval of the synchronising period is received the contact UR4 assumes its right-hand position, and that the relay SYP has such a time-lag that it does not remain in its on-position during the extended interval but drops out. Thereby its contact SYP5 closes, and the relay SYI picks up. The contact SYP1 consequently opens whereas the contact SYI1 closes. Simultaneously the contact SYP2 changes position and short circuits the contact UR3 which is open. At the end of the extended interval in the synchronising period the relay UR drops out and its contact UR4 assumes its left-hand position. The relay SYP picks up then but the relay SYI does not drop out because of its time-lag. Then consequently, the contact SYP1 as well as the contact SYI1 becomes closed, as also the contact UR3. The contact SYP2 assumes at the same time its right position and short circuits the self driving contact VMS of the selector. When the short impulse in the synchronising period is finished the relay UR is energized, so that its contact UR3 opens so that the selector VM is moved one step on to the position 1. Then the home position contact VMH assumes its normal position whereas the relay SYP remains in its on-position and the relay SYI drops out after some time. The circuit is consequently thereafter in its normal condition and the driving of the selector VM is effected in the normal way by the impulses repeseting the metered quantities. In this way it is achieved that the selector VM cannot be driven from its home position unless it is in synchronism with the selector VS in the transmitting device.

If a synchronising period should be received from the transmitting device when the selector VM is in any one of the positions 1–5, the relay SYP drops out in the way previously described, so that its contact SYP2 assumes its left hand position. As at the same time the home position contact VMH is in its normal position, the selector is driven automatically by its self-driving contact VMS to its home position, in which the home position contact VMH assumes its lower position and interrupts the self-driving. At the end of the synchronising period the selector VM will be driven in the way previously described to its first position 1. In this way it is achieved that the selector VM is automatically synchronised with the selector VS in the transmitting device, if they for instance due to an interruption in the transmission channel between the receiving and transmitting devices have fallen out of synchronism. The synchronising relay SYP is also provided with two contacts SYP3 and SYP4 which interrupt the connection between the impulse receiver and the storage devices during the receiving of a synchronising period so that no erroneous voltages are transferred to the storage devices when the selector VM is driven to its home position.

The form of the invention described above is only given as an example, and several other forms are possible within the scope of the invention. In the form shown, two impulses and two intervals are transmitted per cycle of the rotating distributers for the metered quantity 1 whereas for each one of the metered quantities 2, 3 and 4 only one impulse and one interval is transmitted per cycle. All other combinations are, however, of course, also possible, just as the number of metered quantities can also be increased considerably by means of distributers with a larger number of positions. The distributers can, of course, consist of other types of cyclically operating step-by-step switching devices for instance relay chains. The impulse receiver IM can further be constructed with only one capacitor which is charged during the intervals as well as the impulses and therebetween is rapidly discharged, in which case a two-way contact, suitably governed by the receiving relay MR, is necessary to distribute the voltages from this capacitor to the two selector banks VM1 and VM2. In the transmitting device it is also possible to use an impulse transmitter IS which is provided with only one input circuit and which produces an impulse series in which the duration of the intervals as well as the impulses is proportional to the voltage connected to this input circuit, in which case it is necessary that a two-way contact governed by the transmitting relay is connected between the impulse transmitter and the two contact banks VS1 and VS2 in order to connect in the correct succession the voltages proportional to the separate metered quantities, to the single input circuit of the impulse transmitter. If one does not want to separate the intervals and impulses representing one and the same metered quantity, but wants to transmit a complete impulse period each time for each one of the metered quantities this two-way contact is of course not necessary, and only one selector bank on the selector VS is necessary. In that case the impulse receiver IM advantageously consists of only one capacitor which is charged during the duration of a complete impulse period and the voltage of which is transferred at the end of this period to the distributor FM in which case the selector VM can be provided with only one selector bank and the storage devices K1 and K4 can be provided with only one of the capacitors 33 and 34. It is of course further not necessary that the synchronising periods have just the form described above. It is only necessary that the synchronising period has a form which distinctly deviates from the form of the impulse periods representing the metered quantities.

I claim:
1. A system for remote metering of a plurality of values of variable magnitude, comprising a transmitting station, a receiving station and a single transmitting channel connecting said transmitting and receiving stations, said transmitting station comprising a plurality of converting means, one for each value to be metered, said transmitting station having two input terminals and including means responsive to the imposition of voltage on said input terminals to produce an impulse on said connecting channel and an interval, said impulse and interval together constituting an impulse series, a cyclically operating step-by-step switching means, said switching means having at least as many positions as the number of converting means and including means at each such position to connect one of said converting means to one of said input terminals and a different converting means to the other input terminal, whereby said transmitting station imposes on said connecting channel an impulse proportional in length to the electrical value on one of said connected converting means and an interval proportional in length to the electrical value on the other connected converting means, means responsive to the termination of each impulse series to move said switching means one step to connect at least one of said input terminals to a different one of said converting means, said receiving means comprising a plurality of storage means equal in number to the number of values to be metered, an impulse receiver having two output terminals and including means to impose on one of said output terminals an electrical value proportional to the length of an imposed impulse and on the other output terminal an electrical value proportional to the length of an interval, a second cyclically operating step-by-step switching means, said switching means having at least as many positions as the number of converting means and including means at each such position to connect one of said storage means to one of said output terminals and a different one of said storage means to the other output terminal, and means responsive to the termination of each impulse series to move said second switching means one step to connect at least one of said output terminals to a different storage means, said second switching means being synchronized with said first switching means so as to always connect each of said output terminals to the same storage means as the converting means connected during the same impulse series to the corresponding input terminal of the transmitting station.

2. In a system as claimed in claim 1, said first switching means including means to connect each converting means to both said inputs during each cycle of the switching means.

References Cited in the file of this patent
UNITED STATES PATENTS

| | | |
|---|---|---|
| 2,444,950 | Nichols | July 13, 1948 |
| 2,578,643 | Hayslett | Dec. 11, 1951 |
| 2,586,427 | Hagenau | Feb. 14, 1952 |
| 2,596,147 | Hampton | May 13, 1952 |
| 2,845,613 | Pawley | July 29, 1958 |

FOREIGN PATENTS

| | | |
|---|---|---|
| 762,537 | Great Britain | Nov. 28, 1956 |